May 26, 1970 KIYOICHI NIJO 3,514,735
TEMPERATURE SENSITIVE SWITCHING DEVICE
Filed March 8, 1968 4 Sheets-Sheet 1
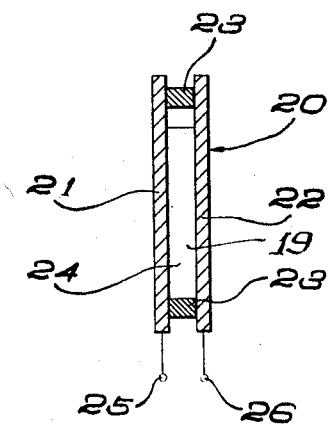
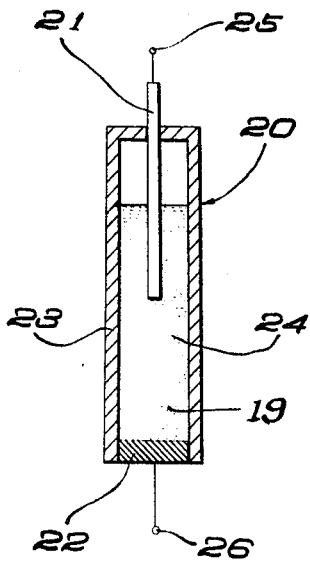
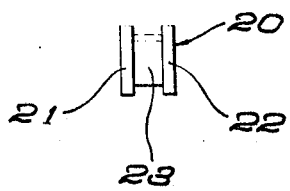
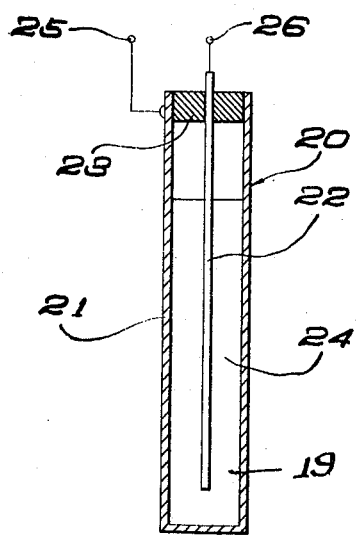
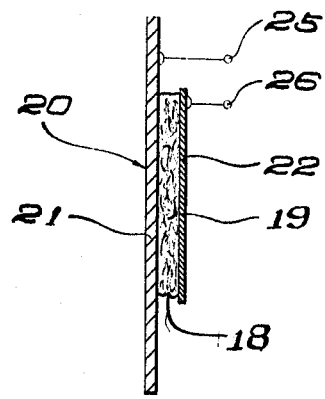
Inventor
Kiyoichi Nijo
By: Olson, Trexler, Wolters & Bushnell
attys

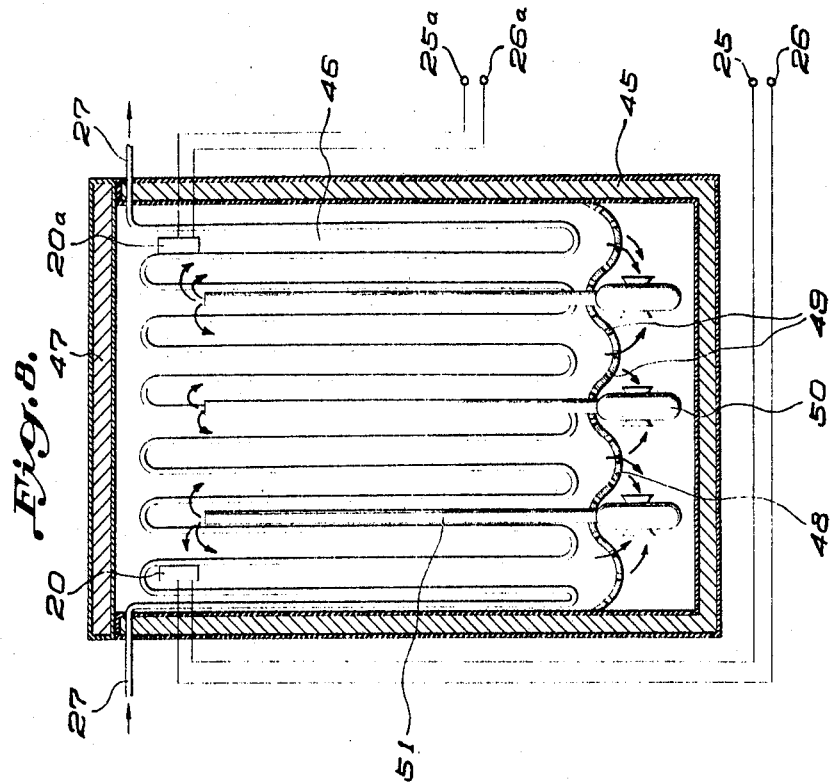
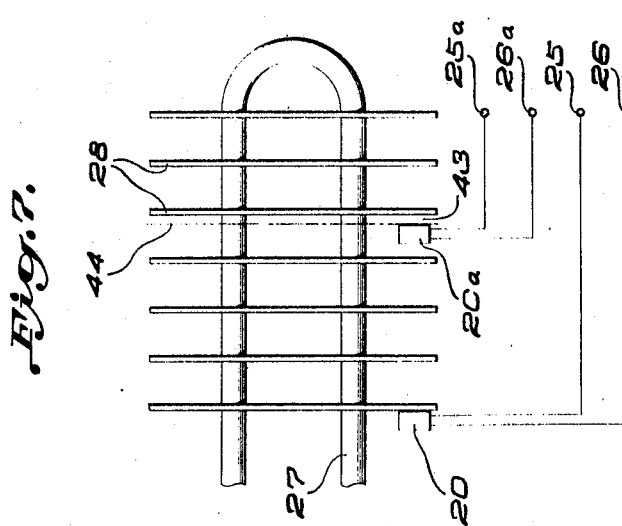

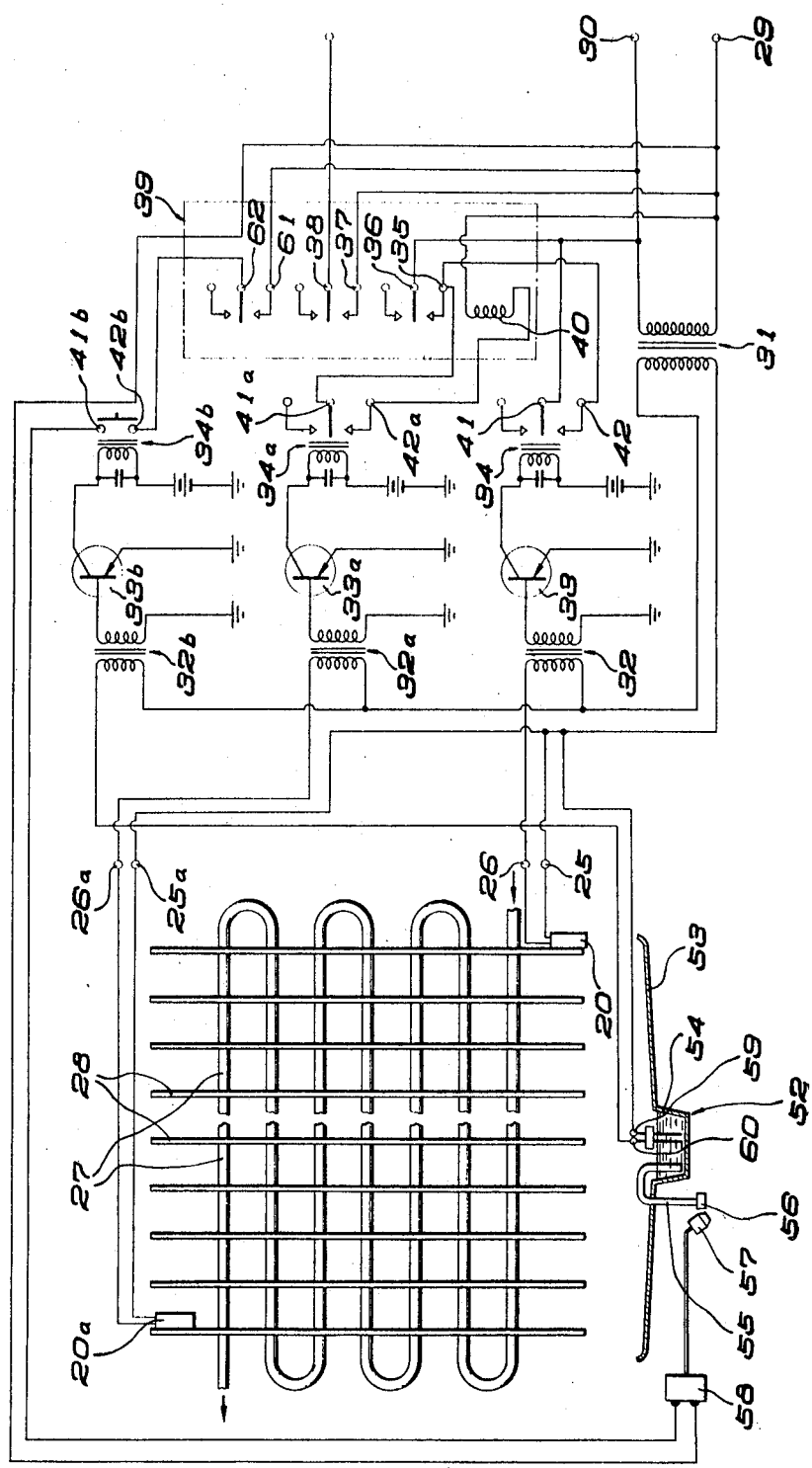

United States Patent Office 3,514,735
Patented May 26, 1970

3,514,735
TEMPERATURE SENSITIVE SWITCHING DEVICE
Kiyoichi Nijo, 4–10 3-chome, Furuichi Odori, Joto-ku,
Osaka, Osaka Prefecture, Japan
Filed Mar. 8, 1968, Ser. No. 711,648
Int. Cl. H01h *37/36;* H01c *7/00*
U.S. Cl. 337—331          6 Claims

ABSTRACT OF THE DISCLOSURE

A temperature controlled switching device and detector comprising two electrodes immersed in a quantity of water which, in one embodiment, includes therein a chemical compound which has an effect on the descent of the freezing point of the water. The device operates in accordance with the difference in resistivity of the water between its liquid and solid states to close or open an external circuit connected to the electrodes thereof, and is well suited for use in refrigerators or the like apparatus for temperature and humidity control and defrosting thereof.

BACKGROUND OF THE INVENTION

This invention relates to switching devices and more particularly to a switching device or detector which is controlled by temperature changes of a medium.

As is well known, ordinary tap water, such as that used in cities, etc., usually contains small amounts of other components which have been added thereto, and therefore has a relatively low electrical resistivity, or conversely, a high electrical conductivity in its liquid state. In contrast with this, ice which has formed from this water has a high resistivity, and therefore a low electrical conductivity. Water which normally has a freezing temperature of zero degrees centigrade therefore has a high electrical conductivity above zero degrees centigrade and a low or almost negligible conductivity therebelow.

In addition to the above, suitable chemical compounds added to water will affect the freezing point thereof so that the water can be made to freeze and melt at temperatures according to the kind and concentration of the particular chemical compound added. This altering of the freezing point of water can likewise affect the electrical conductivity thereof.

SUMMARY OF THE INVENTION

Taking advantage of the above, the instant invention provides a novel temperature sensitive switch or detector which operates in accordance with the state of ordinary tap water. The switching device utilizes the difference in resistivity of water between its liquid and solid states, and can be used in a refrigerator unit or the like, for maintaining the temperature and humidity, and/or removing frost through the control of coolant through the cooling unit of the refrigerator.

Accordingly, an object of the present invention is to provide a new and improved temperature sensitive switching device of simple construction which can be easily and economically produced, and which is able to indicate accurately a temperature of zero degrees centigrade or other predetermined temperatures.

Another object of the present invention is to provide a temperature sensitive switching device or detector which can be used in a refrigerator or the like system for maintaining the temperature therein at a preset level.

A further object of the present invention is to provide a temperature sensitive switching device which can be used in a refrigerator or the like system for automatically removing frost therein.

Still another object of the present invention is to provide a temperature sensitive switching device which can be used in a refrigerator or the like system for maintaining a constant humidity setting therein.

DESCRIPTION OF THE DRAWINGS

A better understanding of the present invention and its organization and construction may be had by referring to the description below in conjunction with the accompanying drawings wherein:

FIG. 1 is a sectional elevational view of a temperature sensitive switching device according to the present invention;

FIG. 2 is a plan view of the switching device of FIG. 1;

FIG. 3 is a sectional elevational view of another embodiment of the device according to the invention;

FIG. 4 is a sectional elevational view of still another embodiment of the switching device according to the invention;

FIG. 5 is a sectional elevational view of yet another embodiment of the switching device according to the invention;

FIG. 7 is a diagrammatic representation of a system with which the switching device according to the invention may be used for removing frost in a refrigerator or the like unit;

FIG. 8 is a sectional elevational view of cold storage equipment which is cooled by sea water through the use of a switching device according to the invention; and FIG. 9 is a schematic diagram of a system with which a switching device according to the invention may be used for maintaining humidity in a refrigerator or the like unit.

DETAILED DESCRIPTION

Figure 6:
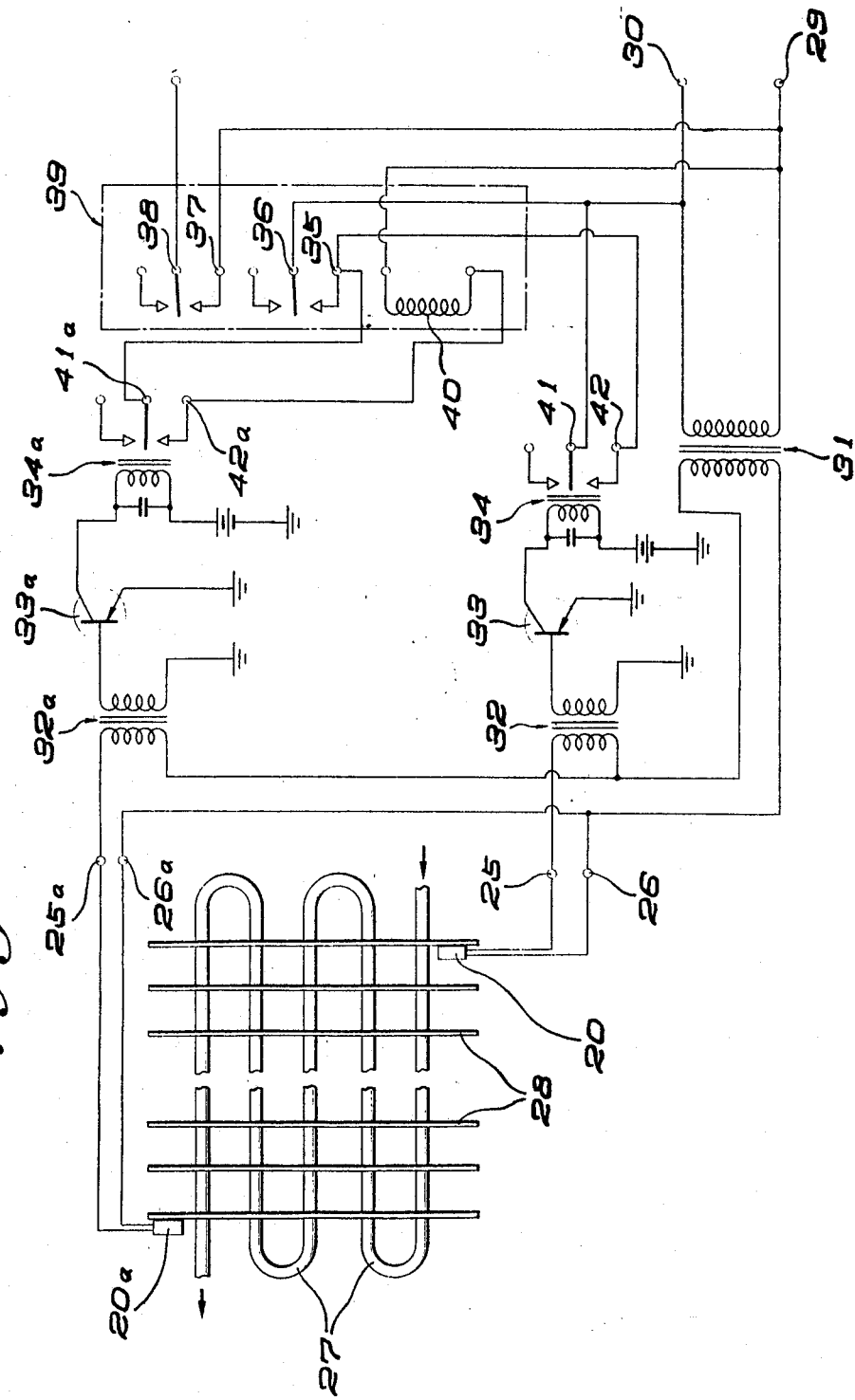
FIG. 6 is a schematic diagram of a system with which the switching device according to the invention may be used for maintaining a constant temperature in a refrigerator or the like unit.

Referring now to the drawings in which like reference numerals designate like parts throughout the several views thereof, there is shown in FIGS. 1 and 2 a first embodiment of a temperature sensitive switching device or detector 20 according to the invention. The device 20 includes a pair of electrodes 21 and 22 which are of a suitable electrically conductive material, such as stainless steel or copper-plated tin. The electrodes 21 and 22 are separated from each other by a non-conducting material 23. Both electrodes 21 and 22 and non-conducting material 23 are tightly secured to one another to provide a compartment 24 therebetween. The compartment 24 includes therein a quantity of water 19 which may or may not have added thereto a suitable chemical compound for altering the freezing point of the water. The compartment 24, as will be noted from FIG. 1, is not completely filled with water 19. This is done purposely to allow for the expansion of the water as it freezes.

If it is desired to operate the switching device at a temperature of zero degrees centigrade, ordinary tap water without a chemical additive is used in compartment 24. As mentioned above, ordinary tap water, unlike purified or distilled water which has a high resistivity with no substantial electrical conductivity in its liquid state, has a low resistivity and considerable electrical conductivity in its liquid state. If the water to be used has substantially no electrical conductivity, a small amount, for example 0.1 weight percent to water, of a chemical compound, added to the water, will provide the necessary electrical conductivity. Some examples of chemical compounds which may be added to the water are potassium chloride and barium chloride.

Ordinary tap water located in the compartment 24 freezes at a temperature of substantially zero degrees centigrade. Thus, the resistivity between terminal 25 of electrode 21 and terminal 26 of electrode 22 is low when the water in compartment 24 is in a liquid state, above zero degrees centigrade, whereas, the resistivity between the aforementioned terminals 25 and 26 is high when the water is in a solid state, below zero degrees centigrade. Therefore, upon the freezing of the water, electrical flow between the electrodes 21 and 22 through the water is curtailed considerably, so that the device 20 according to the invention may be used as a switch which is dependent upon the state of the water used therein. When the device 20 is desired to be used as a switch operable at a temperature differing from that of zero degrees centigrade; i.e., when the device 20 is desired to detect a temperature other than zero degrees centigrade, water containing a concentration of a suitable chemical compound which effects a change in the freezing point of the water, may be dispersed in the water compartment 24 until the freezing point of the water is at the desired predetermined temperature. Thus, the resistivity between terminals 25 and 26 is low when the temperature of the water is higher than the predetermined temperature, and the resistivity is high when the temperature of the water is lower than the predetermined temperature. The temperature sensitive switching device 20 therefore operates at the aforesaid predetermined temperature and thus may be said to accurately detect that temperature.

Examples of suitable chemical compounds which effect the freezing point of water are such inorganic compounds as calcium chloride, magnesium chloride and sodium chloride. Organic compounds having the same effect are ethylene glycol, propylene glycol, diethylene glycol, triethylene glycol, glycerol and acetic acid. Some examples of the relation between the concentration of such chemical compounds and the freezing point of water are as follows:

| Chemical compound affecting the freezing point of water | Wt. percent in water | Freezing point (° C.) |
| --- | --- | --- |
| Calcium chloride | 5.9 | −3.0 |
| Do | 19.9 | −17.4 |
| Do | 25.7 | −31.2 |
| Magnesium chloride | 6.1 | −4.0 |
| Do | 13.8 | −14.5 |
| Do | 20.1 | −32.2 |
| Propylene glycol | 10.0 | −3.0 |
| Do | 20.0 | −7.5 |
| Do | 30.0 | −14.0 |
| Do | 40.0 | −21.0 |

As detailed above, a temperature sensitive switching device and detector which is capable of being operated at practically any predetermined temperature below zero degrees centigrade may be provided when the correct kind and concentration of chemical compound is selected and added to the water. Organic compounds are preferable over inorganic compounds, because the former are not electrolyzed, even in the event that direct or alternating current with low frequency is applied between terminals 25 and 26 of switching device 20.

FIGS. 3, 4 and 5 show other embodiments of temperature sensitive switching devices 20 according to the invention. The embodiment shown in FIG. 3 comprises a cylindrically shaped housing of a non-conducting material 23, an electrode 21 constructed of an electrically conducting material, inserted through the upper surface of the housing, an electrode 22 also constructed of an electrically conductive material, sealing the lower opening of the cylindrical housing, a terminal 25 connected to the electrode 21 and a terminal 26 connected to the electrode 22. The water 19 located in the compartment 24 is sealed hermetically to prevent evaporation, etc., so as to avoid changes in the detector device 20.

The temperature detector device 20 shown in FIG. 4 comprises a cylindrical electrode 21 which also is used as a housing portion. The electrode is constructed of conductive material and a plug of non-conducting material 23 is used to seal the upper opening of the cylindrically shaped housing portion. Electrode 22, also constructed of a conductive material, is inserted through the non-conducting plug into the compartment 24. Terminal 25 is connected to the electrode 21, and terminal 26 is connected to the electrode 22. This embodiment, like that of FIG. 3, is also hermetically sealed to prevent evaporation of water 19 within compartment 24.

The temperature detector 20 shown in FIG. 5 comprises two electrodes 21 and 22 constructed of a conductive material. Herein, however, a water containable web 18, such as a web of cotton or synthetic fibers, is placed between two electrodes. Terminal 25 is connected to the electrode 21 and terminal 26 is connected to the electrode 22. The web 18 takes the place of the compartment 24 of the other embodiments, in that it holds the water 19 necessary for the operation of the device. The web is preferably of a non-corrosive material, to avoid rust, etc.

The following will describe some of the uses to which a temperature sensitive switch according to the invention may be put.

Referring to FIG. 6, there is shown therein a system for maintaining the temperature of refrigerator units constant by using two temperature detectors 20 and 20a according to the invention. A first temperature detector 20 is affixed to a cooling fin 28 attached to a cooling coil 27 at the inlet side thereof wherein coolant is introduced thereinto, and the other detector 20a is affixed to a cooling fin 28 at the outlet side of coolant carrying coil 27. The amount of coolant flowing through the coil 27 determines the temperature of the refrigerator unit. The detectors 20 and 20a, as shown in FIG. 6, are so constructed that they will switch upon the detection of a temperature of zero degrees centigrade; i.e., when the water used therein freezes at zero degrees centigrade. The terminals 25, 26 and 25a, 26a of respective detectors 20 and 20a are connected to a control circuit as shown in FIG. 6. The circuit controls the circulation of coolant through cooling coils 27 and is operated itself in accordance with the state of detectors 20 and 20a. The input terminals 29 and 30 of the control circuit are connected to a power source (not shown) and to terminals 26 and 26a of the detectors through a transformer 31. When the resistance between terminals 25 and 26 and 25a and 26a, respectively, is low, considerable electric current flows from the power source through detectors 20 and 20a. This current is introduced at transformers 32 and 32a. The outputs of the last-mentioned transformers are connected to respective transistors 33 and 33a at respective inputs (base electrodes) thereof, causing the transistors 33 and 33a to be operated. The transistors in turn amplify the current, to operate micro-relays 34 and 34a connected at the outputs of respective transistors 33 and 33a. The operation of the micro-relays operates relay 39 accordingly.

The operation of the cooling arrangement of FIG. 6 is as follows:

Before the refrigerator unit is cooled, considerable electric current flows between terminals 25 and 26 and 25a and 26a, as described above, because the water in the respective detectors 20 and 20a is in a liquid state. This current operates transistors 33 and 33a through respective transformers 32 and 32a and, as explained above, is amplified by the transistors to operate the micro-relays. As contacts 41 and 42 and 41a and 42a of respective micro-relays 34 and 34a are closed, relay 39 operates to switch contacts 37 and 38 thereof which operate the cooling mechanism (not shown) to provide a flow of coolant through coil 27. The flow of coolant, in turn, causes the refrigerator unit to be cooled. As the refrigerator cools, the water in the detector 20 at the inlet side of coil 27 begins to solidify until it freezes at a temperature of zero degrees centigrade. The freezing of the water in detector 20 produces a high resistance between the electrodes thereof and causes the flow of electrical current therebetween to cease. Thus, contacts 41 and 42 of micro-relay 34 are opened, but switch elements 35 and 36 of relay 39 connected thereto remain in an on state, due to the operation of contacts 41a and 42a which hold coil 40 of the relay 39 operated. Thus, the circuit comprising input terminal 30, relay 39, contacts 41a and 42a of micro-relay 34a and input terminal 29 is maintained in a conductive state, and switch elements 37 and 38 therefore remain in contacting engagement. The cooling of the inside of the refrigerator unit continues and, as the cooling proceeds, the water in the detector 20a at the outlet side of the cooling coil 27 reaches its freezing point. After this occurs, the resistance between terminals 25a and 26a becomes high, so that contacts 41a and 42a of micro-relay 34a are opened. Thus, relay 39 ceases to operate. Switch elements 37 and 38 in turn open and the cooling unit (not shown) no longer supplies coolant to coil 27. As the temperature within the refrigerator begins to rise, the cooling operation is repeated.

The rise in temperature within the refrigerator unit causes the water in detector 20a at the outlet side of coil 27 to begin to change to a liquid state, decreasing the resistance between terminals 25a and 26a and once again causing the contacts 41a and 42a of the micro-relay to be closed. This, however, does not operate switch contacts 35 and 36, and relay 39 also remains non-operative. As the temperature continues to increase, the water in detector 20 at the inlet side of coil 27 begins to melt and the resistance between terminals 25 and 26 becomes low, so that the contacts 41 and 42 of micro-relay 34 are closed. Relay 39 is then operated and contacts 37 and 38 thereof close so that the cooling unit once again begins to operate.

As the system shown in FIG. 6 repeats the above operation, the temperature in the refrigerator is maintained at approximately zero degrees centigrade. This technique, while keeping a constant temperature in the refrigerator, also prevents frost from being produced on the cooling fins thereof.

When it is desired to operate the refrigerator until below the temperature of zero degrees centigrade, a suitable amount of chemical compound effecting the descent of the freezing point of the water may be added to the water of the detectors.

It is also possible in an arrangement such as described above, to use only one temperature sensitive switching device 20 according to the invention. In this case, the detector is attached to a cooling fin somewhere between the inlet and outlet portion of the cooling coil 27, and it alone controls the cooling unit (not shown) in a similar manner as the two detectors in FIG. 6.

If the temperature in a refrigerator unit is desired to vary over a certain range, for example, a temperature range between zero degrees centigrade and —20 degrees centigrade, a pair of detectors, one of which detects zero degrees centigrade and the other —20 degrees centigrade may be affixed to the cooling fins, as shown in FIG. 6.

Turning now to FIG. 7, there is shown therein a system for removing frost from the cooling fins of a refrigerator unit. In this figure, the control circuit had not been shown. Generally, in refrigerators, water from the air accumulates on the cooling fins and evaporator, etc., thereof. This water is changed to frost by cooling, and the frost inhibits the conduction of heat by the cooling fin and also provides resistance to air flow about the cooling fin, decreasing the cooling efficiency of the cooling system. To overcome this, it is necessary to remove such frost. Known frost removing arrangements provide switches which turn the cooling system on or off, either automatically or by manual means. Some other arrangements provide hot gas which flows through the cooling coil to melt the frost. These methods, however, have many disadvantages. In the first method, using an automatic switch, the switch turns on even when no frost is present on the fins and goes off in some cases before the frost has been completely removed from the fins. This provides a low efficiency of frost removal at a high cost. The manually operated means is very troublesome and often one forgets to operate the system.

Through the use of the temperature detector according to the present invention the aforementioned disadvantages are avoided. In the system shown in FIG. 7, a temperature detector 20 is affixed to cooling fin 28 at a point whereat the temperature of the fin is coolest and the other temperature detector 20a is affixed to a plate 44 adjacent cooling fin 28 at a point whereat the temperature of the fin 28 is less cool. The width of the gap 43 between the plate 44 and fin 28 is predetermined so as to correspond to the thickness of frost which is intended to be removed from the fins 28. Temperature detectors 20 and 20a are so constructed as to detect a temperature of zero degrees centigrade, i.e., the water used therein has a freezing point of zero degrees centigrade. Terminals 25 and 26 of detector 20 and terminals 25a and 26a of detector 20a are connected to an electrical control circuit in a manner similar to that shown in FIG. 6.

The operation of the system of FIG. 7 is as follows:

Normally the water in detectors 20 and 20a is in a liquid state so that the switch elements calling for more coolant through coil 27 are in an on state, thus cooling proceeds. As the cooling continues and frost begins to form on cooling fins 28 near the position of detector 20, the water in detector 20 freezes and the resistivity between terminals 25 and 26 becomes high to turn off detector switch 20. The switch elements controlling the flow of coolant, however, remain in an on state and the cooling proceeds as related in the description of the system of FIG. 6. As the cooling continues, more and more frost builds up on fin 28 near detector 20a until the gap 43 between plate 44 and adjacent fin 28 becomes filled with ice. At this time, the water in detector 20a also freezes, so that the resistivity between terminals 25a and 26a becomes high and in turn the switch elements controlling the flow of coolant are turned off. This allows for the defrosting of the ice which has accumulated on fin 28. The ice melts as the temperature in the refrigerator becomes higher.

The frost in the gap 43 melts first and consequently the water in detector 20a, which had become frozen, melts, so that the resisivity between the terminals 25a and 26a once again becomes low. The switch elements controlling the coolant, however, remain in an off state. As the frost continues to melt, the resistivity between terminals 25 and 26 of detector 20 becomes low, due to the melting of the water therein. When the water of detector 20 reaches a liquid state, the cooling switch elements are turned on to repeat the cooling process. Cooling begins only after the frost has been entirely eliminated, always maintaining the temperature in the refrigerator unit within a certain predetermined range.

FIG. 8 shows cold storage equipment which is cooled through the use of sea water. This equipment is used for the cold storage of fish and the like. Prior to using this type of equipment, fish were surrounded with ice to keep them fresh, or kept in refrigerators. The first method required a considerable amount of ice, and the ice, when packed on the fish, caused damage to them and made them unmarketable, and the second method took too long to cool the fish to a desirable temperature. In addition, both methods presented a problem of accessibility to the fish.

The temperature sensitive switch according to the invention is able to be used with the sea water cooled equipment described above to maintain the sea water at a predetermined temperature just above the freezing point thereof.

Referring to FIG. 8, a housing 45 is formed to provide a tank 46. The tank 46 includes a cover 47 which can be put on and taken off freely from the housing. The body 45 and cover 47 both are constructed of insulating material. Tank 46 is filled with sea water which is cooled by a coolant circulated through cooling coil 27 within tank 46 from a cooling system (not shown). A plate 48 with a number of perforations 49 therein is installed at the bottom of the tank 46, and beneath the plate 48 are located a suitable number of pumps 50 which are able to be operated in the sea water. Pipes 51 are attached to the pumps 50 and extend vertically upwardly into tank 46. The upper openings of pipes 51 are disposed in the upper end of tank 46. Through the operation of pumps 50, sea water in tank 46 flows down through perforations 49, is sucked into pumps 50 and is pumped to the upper end of tank 46 where it is expelled. This circulation of the sea water causes the temperature in tank 46 to become substantially uniform throughout.

Temperature detectors 20 and 20a according to the invention are affixed to the coolant carrying coil at the inlet and outlet sides thereof, respectively, much as in the case of the refrigeration unit of FIG. 6. Terminals 25 and 26 of detector 20 and 25a and 26a of detector 20a are connected to an electrical control circuit, also like the one shown in FIG. 6. Detectors 20 and 20a are so constructed as to detect a desired temperature which is somewhat higher than the freezing point of sea water. As the cooling of the sea water in tank 46 takes place, the water in detector 20 freezes first, in response to the sea water in tank 46 adjacent detector 20 being cooled to the desired temperature. In this case, however, the coolant flowing through coil 27 continues to be circulated, even though the resistivity between terminals 25 and 26 of detector 20 becomes high, and the switch 20 is opened. As the temperature of the sea water near detector 20a reaches the desired temperature, the resistivity between terminals 25a and 26a also becomes high as a result of the changing state of the water in detector 20a from liquid to ice. At this time, switch elements controlling the flow of coolant are opened to turn off the flow of coolant and the cooling operation ceases, as in the case of the apparatus of FIG. 6.

When the temperature of the sea water rises, the resistivity between the terminals 25a and 26a becomes low, due to the water therein melting to a liquid state. The cooling operation, however, is not initiated at this time. As the temperature of the sea water continues to rise, the resisivity between terminals 25 and 26 becomes low, and detector 20 is turned on. This causes the cooling operation to begin once again. Thereafter, the cooling operations are repeated intermittently and automatically, so that the temperature of the sea water in tank 46 is maintained at the desired level. The sea water never freezes, but its temperature is maintained low enough to keep the fish or the like fresh therein. Further, the fish may be removed easily from the tank through the use of fish nets, etc.

In FIG. 9, there is shown a system which, through the use of a temperature sensitive switching detector according to the invention, maintains proper humidity in a refrigerator unit. In the system of FIG. 9, a pair of temperature detectors 20 and 20a are affixed to cooling fins 28 of a cooling coil 27 at the inlet side and at the outlet side thereof, respectively. Terminals 25 and 26 of detector 20 and 25a and 26a of detector 20a are connected to an electrical control circuit like that shown in FIG. 6. These detectors are set to switch state at a temperature of zero degrees centigrade. Spraying apparatus 52 is installed at the lower end portion of the inside of the refrigerator unit and comprises a cavity 54 at the center thereof for storing water therein, a water receiving disc 53 for receiving and gathering water droplets at both sides of the cavity 54 and a U-shaped tube 55, one end of which is opened into the cavity 54. The other end of the tube 55 is affixed to a sprinkler 56 adjacent a spray nozzle 57. Nozzle 57 is operated by a solenoid switch 58 connected thereto. The terminals of the solenoid switch are connected to the contacts 41b and 42b of micro-relay 34b. A volume of water having a relatively high electrical conductivity is provided in cavity 54 and terminal rods 59 and 60 are inserted into the water. The terminal rod 59 is connected to a common lead with terminals 25 and 25a of detectors 20 and 20a and terminal 60 is connected to one side of a transformer 32b which is interconnected in parallel relation with transformer 32a and 32, as shown in FIG. 9.

The operation of the detectors 20 and 20a and the control circuit shown in FIG. 9, is similar to the one shown in FIG. 6; that is, the switch elements 37 and 38 which supply coolant are in the on state when the water in both detectors 20 and 20a is in the liquid state.

As the cooling process proceeds, electrical current from the power source (not shown), connected at terminals 29 and 30, flows between terminal rods 59 and 60 inserted into the water in cavity 54 because of the relatively low resistivity of the water between the rods. This current flow passes through transformer 32b and is amplified by transistor 33b and is fed back to micro-relay 34b to close contacts 41b and 42b thereof. With switch elements 61 and 62 of relay 39 being in an on state, the solenoid switch 58 operates and compressed air sprays are expelled through nozzle 57, so that the water in cavity 54 is in turn expelled as vapor through U-shaped tube 55 and is conducted, by means of sprinkler 56, to the inside of the refrigerator to supplement the moisture therein. When all of the water in cavity 54 has been exhausted, the resistivity between terminal rods 59 and 60 becomes high, so that contacts 41b and 42b of micro-relay 34b are opened, thus discontinuing the spraying operation. The spraying operation also ceases when the relay 39 is unoperated and switch elements 61 and 62 are opened.

When the temperature of the inside of the refrigerator rises, frost and water droplets combine on cooling fins 28 and begin to fall as water droplets onto receiving disc 53 and flow from there into cavity 54. At the same time, water in detector 20a melts and the resistivity between the terminals thereof becomes low. The relay 39, however, does not yet operate because of the open switch elements 35 and 36. When the water in detector 20 finally melts, ample water has filled cavity 54. With the resistivity between terminals 25 and 26 being low, due to the melting of the water therebetween, switch elements 37 and 38 are closed and the cooling operation begins once more, as described above in regard to the circuit of FIG. 6.

The spraying nozzle of the system of FIG. 9 normally operates during the cooling operation, but may be operated during the time the temperature rises in the refrigerator, if desired. Thus, through the use of the temperature detector according to the invention, the removal of frost and the supplementing of moisture in intermittent periods of time is made possible. In addition, the temperature of a refrigerator unit may be controlled thereby.

While particular embodiments of the invention have been shown, it should be understood, of course, that the invention is not limited thereto, since many modifications may be made; and it is, therefore, contemplated to cover by the appended claims any such modifications as fall within the true spirit and scope of the invention.

What is claimed is:

1. A temperature sensitive repeating action switching device adapted for use in refrigerators for controlling temperature and humidity and defrosting, said device comprising a container having electrically conductive liquid therein with a predetermined freezing temperature, and a pair of electrodes spaced from one another and each contacting said liquid, the switching device being in an electrically conductive state between said electrodes above said freezing temperature due to the considerable electrical conductivity of said liquid and being in a non-conductive state between said electrodes below said predetermined freezing temperature due to the high electrical resistivity of the frozen liquid.

2. A temperature sensing switching device as claimed in claim 1, wherein the liquid is water with a freezing point of 0° C. or below.

3. A temperature sensitive switching device as claimed in claim 1 wherein said container is hermetically sealed and wherein at least one of said electrodes comprises a portion of said container.

4. A temperature sensitive switching device as claimed in claim 1 wherein said container includes a fibrous web disposed between said electrodes for holding said liquid therein.

5. A temperature sensitive switching device as claimed in claim 1 wherein said liquid includes therein additive means for altering the temperature at which said liquid normally changes state.

6. A temperature sensitive switching device as claimed in claim 2 wherein said water includes therein a chemical compound for altering the temperature at which said water changes state.

References Cited

UNITED STATES PATENTS

| | | | |
|---|---|---|---|
| 1,932,988 | 10/1933 | Raney | 337—332 X |
| 1,475,313 | 11/1923 | Newhard | 200—83 |
| 1,940,176 | 12/1933 | Marshall | 337—405 |
| 2,705,270 | 3/1955 | Moran | 337—326 |
| 3,200,388 | 8/1965 | Uhlig | 200—61.04 X |
| 3,260,809 | 7/1966 | Leasko | 200—61.04 |
| 3,288,960 | 11/1966 | Miller | 200—61.04 |
| 2,322,118 | 6/1943 | Ellis | 219—284 |
| 3,005,083 | 10/1961 | Mendoza et al. | 219—291 |
| 2,543,177 | 2/1951 | Korsgren | 338—30 |
| 2,728,836 | 12/1955 | Boisblanc et al. | 338—30 |

H. B. GILSON, Primary Examiner

U.S. Cl. X.R.

338—30